United States Patent [19]

Yeung et al.

[11] Patent Number: 5,167,216
[45] Date of Patent: Dec. 1, 1992

[54] VAPOUR JACKETED COOKING VESSEL WITH BURNER

[75] Inventors: Wing Yiu Yeung, Richmond Hill; Gordon P. Mabee, Orillia, both of Canada

[73] Assignee: Cleveland Range Ltd., Concord, Ontario, Canada

[21] Appl. No.: 696,806

[22] Filed: May 7, 1991

[51] Int. Cl.[5] .................. F27B 14/02; F27B 14/4; F27B 14/20
[52] U.S. Cl. ................... 126/349; 126/344; 126/351; 165/104.21; 432/157; 99/403
[58] Field of Search ............. 126/344, 345, 346, 347, 126/348, 349, 369, 369.1, 369.2, 369.3, 351; 122/367.1, 367.2, 367.3; 165/104.21; 432/156, 157, 158; 222/164, 165, 166; 159/32, 34, 37; 366/149, 185; 99/403; 219/439, 440, 430, 431

[56] References Cited

U.S. PATENT DOCUMENTS 3,823,307  7/1974  Weiss ..................... 165/32H X
4,660,542  4/1987  Scherer .................. 126/348 X

FOREIGN PATENT DOCUMENTS

482307   9/1926  Fed. Rep. of Germany ...... 126/369
526189   6/1928  Fed. Rep. of Germany ...... 126/349
276184   6/1930  Italy ...................... 219/440
647189  12/1950  United Kingdom ........... 126/349

Primary Examiner—Carl D. Price
Attorney, Agent, or Firm—Bereskin & Parr

[57] ABSTRACT

A cooking vessel includes a kettle partially surrounded by a vapour jacket. An evaporator for containing fluid is mounted to the kettle and includes a tubular portion and is in fluid communication with the jacket to act as a vapour source for the jacket and to receive condensed fluid from the jacket. A burner is mounted to the kettle and located within the tubular portion of the evaporator.

13 Claims, 6 Drawing Sheets

VAPOUR JACKETED COOKING VESSEL WITH BURNER

FIELD OF THE INVENTION

This invention relates to a vapour jacketed cooking vessel with a burner, and in particular to a steam kettle with a gas burner.

Vapour jacketed cooking vessels, most commonly in the form of steam kettles, are widely used in hotels, restaurants and institutions for cooking and heating foodstuffs. A typical vessel comprises a 40–100 gallon capacity stainless steel kettle, a lower portion of the kettle being surrounded by a steel jacket. The kettle may be mounted in a tilting frame which may also support a motor driven mixer. Steam is supplied to the jacket and gives up latent heat by condensing on the outer surface of the kettle and thus heats the kettle to the temperature of boiling water at the pressure maintained in the jacket.

The steam source may be a central steam boiler, this being known as direct heating, or may be a dedicated boiler or evaporator such that the vessel is a self-contained unit. Dedicated evaporators are commonly heated by electric heating elements but also utilises gas burners. In a typical electrically heated kettle, a plurality of heating elements are located in the lower portion of a combined evaporator and condenser at the base of the kettle.

In conventional kettles provided with gas heated burners, the burner is fixed to the support frame and heats evaporator tubes mounted to the kettle. The burners are located below the tubes and, in tilting kettles, are configured to permit separation of the burner and the evaporator tubes when the kettle is tilted.

SUMMARY OF THE INVENTION

According to one aspect of the present invention there is provided a cooking vessel including a kettle at least partially surrounded by a vapour jacket. An evaporator is mounted to the kettle and is in fluid communication with the jacket to act as a vapour source for the jacket and to receive returning condensed fluid from the jacket. A burner is mounted to the evaporator.

Preferably, the evaporator includes a tubular portion and the burner is located at least partially within this tubular portion. Thus, the burner may be completely surrounded by the evaporator to enhance the efficiency of the evaporator heating. To further enhance efficiency, the evaporator may include a burner flue passage which extends from the interior of the tubular portion around at least a portion of the outer surface of the tubular portion to direct flue gas from the burner over at least a portion of the inner and outer surfaces of the tubular portion.

The vapour jacket will normally be located around a lower portion of the kettle and the evaporator is located at least as low as the vapour jacket. The fluid level in the tubular portion of the evaporator will normally be maintained to completely immerse the inner wall which is heated by the burner.

The kettle may be tiltably mounted on appropriate supports and as the burner and evaporator are mounted on the kettle, the kettle, evaporator and burner tilt as a unit.

A burner fuel supply line is provided and, for tilting kettles, preferably includes a swivel joint at a pivot mounting between the kettle and the support. This minimizes the need for flexible burner fuel supply lines. As mentioned above, the inner wall is normally surrounded by fluid which cools and stabilises the temperature of the inner wall. If the uncovered wall was heated, the high temperature and associated expansion of the uncooled wall, which is typically of mild steel, would accelerate deterioration of the wall. For tilting kettles, a water level sensor may be provided to inactivate the burner when the kettle is tilted and the sensor detects that the inner wall of the tubular portion has become uncovered. Alternatively, or in addition to a water level sensor, a tilt switch may be provided to inactivate the burner when the kettle is tilted in the support and the inner wall of the tubular portion is uncovered. It is also possible to provide a safety thermostat which will shut off the burner when the temperature of the inner wall rises above a predetermined level.

According to a still further aspect of the present invention there is provided a cooking vessel including a kettle partially surrounded by a vapour jacket and having a pouring lip on one side. The kettle is tiltably mounted in a support frame. An evaporator is mounted to the other side of the kettle and includes a tubular portion and is in fluid communication with the jacket to act as a vapour source for the jacket and to receive returning, condensed fluid from the jacket. A burner is mounted to the kettle and located within the tubular portion of the evaporator.

BRIEF DESCRIPTION OF DRAWINGS

These and other aspects of the present invention will now be described, by way of example, with reference to the accompanying drawings, in which.

DETAILED DESCRIPTION OF DRAWINGS

Figures 1, 2, 3:
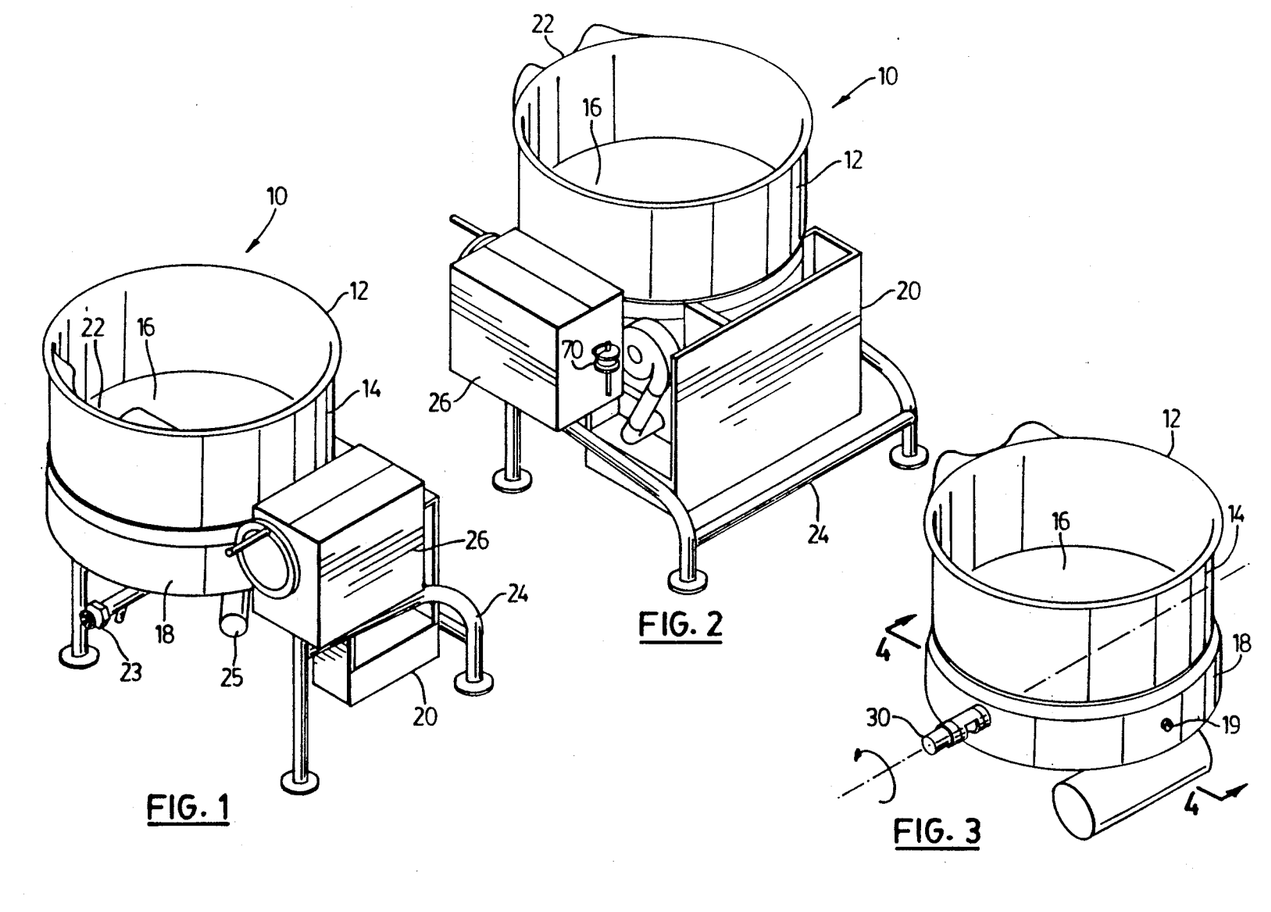
FIG. 1 is a perspective view from above of a vapour jacketed cooking vessel with a burner, in accordance with a preferred embodiment of the present invention.
FIG. 2 is a perspective view from the rear of the cooking vessel of FIG. 1.
FIG. 3 is a perspective view from the rear of the kettle and evaporator of the cooking vessel of FIG. 1.

Reference is first made to FIGS. 1 and 2 of the drawings which show a vapour jacketed cooking vessel with a burner in accordance with a preferred embodiment of the present invention. The cooking vessel illustrated is capable of tilting in its supporting frame, but it should be noted that many aspects of the present invention are not limited to tilting cooking vessels and may be equally applicable to stationary or fixed vessels.

The vessel 10 comprises a kettle 12 with a cylindrical wall portion 14 and a hemispherical wall portion 16. A hemispherical jacket 18 is provided around the portion 16 to provide a vapour jacket. Steam is supplied to the jacket 18 from an evaporator located in a box 20 mounted to the bottom rear of the kettle 12. In the Figures, the box 20 is illustrated with various top and side covers removed. As will be described, steam is supplied from the evaporator to the jacket 18, where the steam gives up latent heat by condensing on the outer wall 16 of the kettle and thus heats the kettle to the temperature of boiling water at the pressure maintained in the jacket. The condensed steam then returns to the evaporator.

The kettle 12 is mounted in a tubular frame 24 and in this particular embodiment the kettle 12 is tiltable in the frame 24. The tilt mechanism, which will be described in more detail, is accommodated in a side box 26 mounted on the frame 24. A pouring lip 22 is provided at the front upper edge of the kettle 12. The kettle 12 also includes various conventional features, such as a pouring spout 23 and a sight glass 25 to permit viewing of the water level in the jacket 18.

FIG. 3 of the drawings shows the kettle 12 and the evaporator 28 separated from the rest of the vessel. Trunnion mounts 30 (trunnion mount on far side not shown) are provided on the kettle 12 to engage complementary bearings in the side box 26, on the near side of the kettle 12 as shown in FIG. 3, and in the frame 24 on the far side of the kettle.

Figures 4, 5:
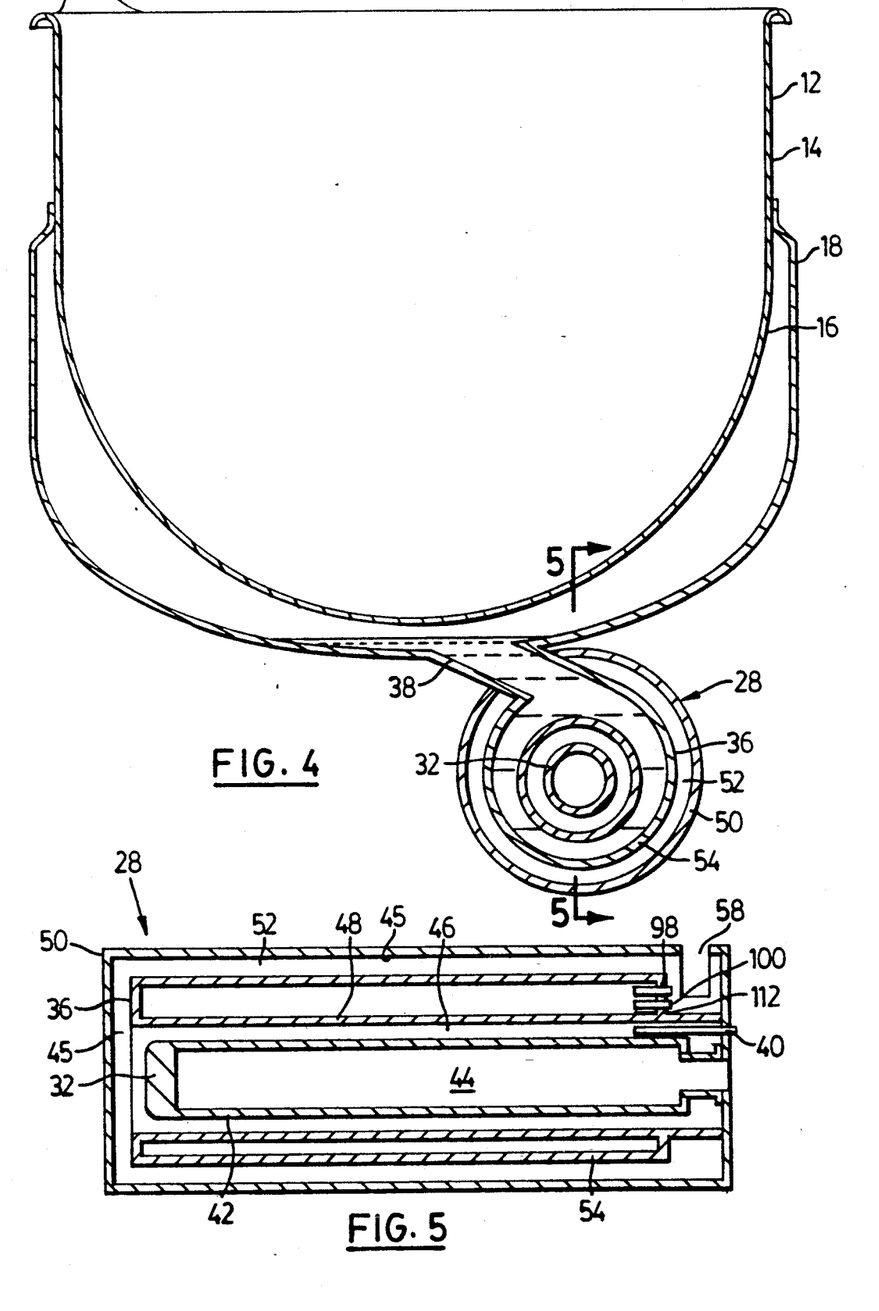
FIG. 4 is a sectional view of the kettle and evaporator on line 4—4 of FIG. 3.
FIG. 5 is a section view of the evaporator on line 5—5 of FIG. 4, and also showing the burner of the cooking vessel of FIG. 1.

Reference is now also made to FIGS. 4 and 5 of the drawings which illustrate details of the evaporator 28 and also a burner 32 which is located in the evaporator 28. FIG. 4 shows the kettle 12 and evaporator 28 in section, the evaporator 28 comprising a tubular portion 36 in fluid communication with the jacket 18 by means of a connecting pipe 38 which extends from an upper wall of the tubular portion 36 to a lower portion of the jacket 18. The pipe 38 serves as a conduit for steam passing from the evaporator 28 to the jacket 18 and also as a conduit for returning condensate. The burner 32 is located within the tubular portion of the evaporator and is supplied, from one end, with a forced gas and air mixture. The means for controlling the gas and air supply will be described in more detail. The gas is ignited by a hot surface igniter or "glow" igniter 40 at the entry end of the burner. The burner includes a cylindrical, porous wall 42 where the gas burns. The arrows 44 in FIG. 5 illustrate the path of the gas and air mixture into the burner 32 and then through the wall 42 into an annular space 46 between the burner 32 and inner wall 48 of the tubular portion 36. In use, the burner wall 42, which may be formed of ceramic fibre, glows red hot and provides significant radiant heat to the evaporator 28 and as the inner wall 48 substantially surrounds the burner 32, the efficiency of the burner 32 compares favourably with conventional direct flame heating burners. To further increase efficiency, the burner 32 and the tubular portion 36 of the evaporator are contained within a cylindrical casing 50 which defines an external flue passage 52 around the outer wall 54 of the tubular portion. Thus, flue gas from the burner, indicated by arrows 45, passes along the annular space 46 between the inner wall 48 and the burner 32 and then over the outer wall 54 before exiting through a flue gas outlet 58. During the passage of the hot flue gas around the tubular portion 36, additional heat is given up to the evaporator 28 and the water contained therein.

It will be noted from FIGS. 4 and 5 that the inner and outer walls 48, 54 are cylindrical and have parallel longitudinal axis, though the axis of the inner wall 48 is spaced vertically downwardly of the axis of the outer wall 54. It is desirable to have the inner wall 48 immersed in water to cool and stabilize the temperature of the inner wall; if the wall is left uncovered while the burner is on, the high temperature and associated expansion of the uncooled wall would likely accelerate deterioration of the wall. It is possible that if the water above the inner wall was of shallow depth the cooling effect of the water could be substantially reduced during vigorous boiling of the water contained in the evaporator 28. Accordingly, the downward relative displacement of the inner wall 48 provides for a greater depth of water above the inner wall.

Figures 6, 9:
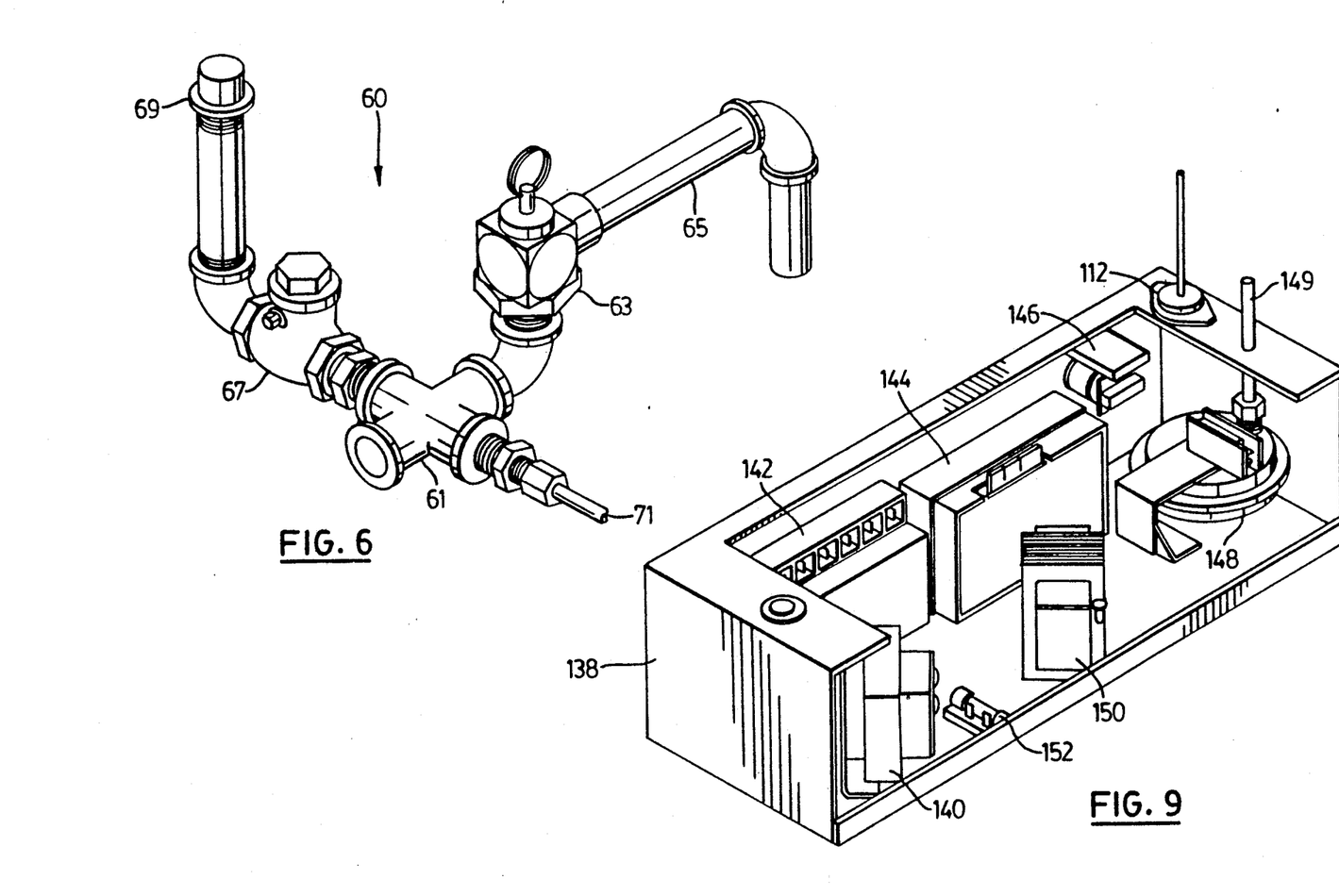
FIG. 6 is a perspective view of a pressure relief assembly for provision on the vessel of FIG. 1.
FIG. 9 is a perspective view of an electrical component box assembly of the cooking vessel of FIG. 1 (on same sheet as FIG. 6)
Figure 8:
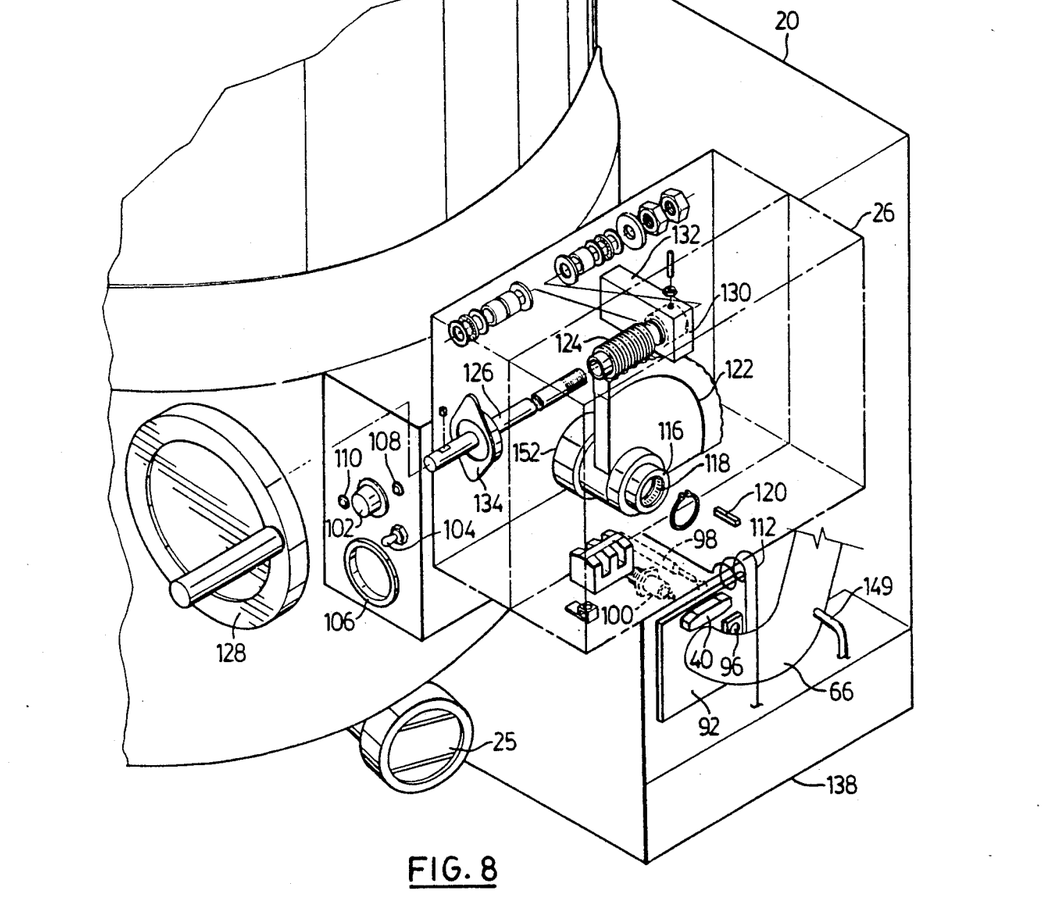
FIG. 8 is a perspective view showing the tilt assembly and various sensors of the cooking vessel of FIG. 1.

FIG. 6 of the drawings illustrates a pressure relief assembly 60 which is mounted to the rear of the jacket 18, but not shown in previous views. The assembly 60 is attached to a fitting 19 provided on the jacket 18 through a cross tee 61. One branch of the tee 61 connects to a 50 p.s.i. safety valve 63 provided with outlet piping 65. Attached to another branch of the tee is a water top-up pipe which is normally closed by a cap 69. A check valve 67 is provided between the tee 61 and the top-up pipe to prevent steam escaping through the pipe if the cap is removed when the jacket 18 and evaporator 28 is still under pressure. Connected to the last branch of the tee 61 is a small diameter pipe 71, for example, a ¼" copper pipe which leads to a pressure gauge 106 (FIG. 8).

As was mentioned above, the evaporator 28 and also the burner 32 are located within the box 20, insulating material being packed around the evaporator 28. The box 20 is divided into two compartments, with the larger compartment accommodating the evaporator and burner. A smaller side compartment accommodates parts of the gas and air supply systems of the vessel, which will now be described with reference to FIG. 7 of the drawings.

Like the box 20, the side box 26 is divided into two compartments, the outermost compartment of the box 26 accommodating a further part of the gas supply control system.

Figure 7:
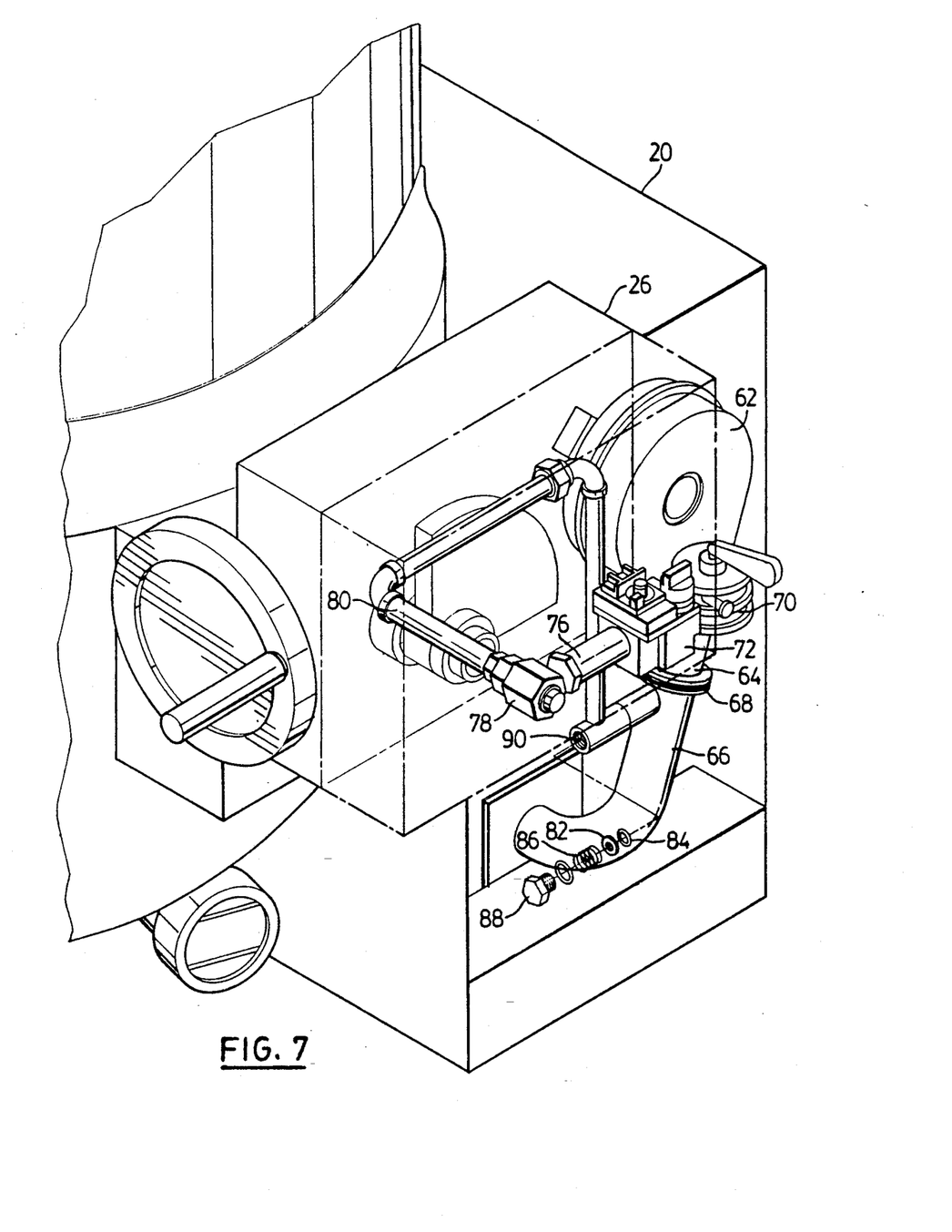
FIG. 7 is a perspective view of the gas control assembly of the cooking vessel of FIG. 1.

Mounted in the side compartment of the larger box 20 is an air blower 62 which draws in air and pushes it through a series of pipes 64, 66 and connecting elbows into the burner 32. Gas is drawn into the airstream at a mixing chamber formed in the pipe 66. The gasket between the pipes 64, 66 includes an air orifice 68, the diameter of which may be varied according to the desired output of the burner.

The gas is supplied from a suitable source and initially passes through a manual shut-off valve 70 which is located on the outside rear of the side box 26. From the valve 70, the gas passes through a control valve 72 and a short length of pipe 76 to a swivel joint 78. A pipe 80 leads from the swivel joint 78 and extends through the hollow trunnion mount 30 (FIG. 3). From the pipe 80, the gas passes through various pipes and elbows and from a gas orifice 82 into the pipe 64. The diameter of the orifice 82 is dictated according to the desired output of the burner and the washer defining the orifice 82 is held against an O-ring 84 by means of a spring 86 which bears against a plug 88 located in the end of a pipe 90 in which the orifice 82 is located.

Reference is now also made to FIG. 8 of the drawings which illustrates the tilt mechanism of the vessel and also illustrates a number of sensors and some of the electrical control components of the vessel. The end of the pipe 66 which carries the air/gas mixture to the burner may be seen in the Figure, and it will be noted that the end of the pipe 66 is provided with a square plate 92 which, in use, attaches to the end of the burner 32 and evaporator 28. The plate 92 provides mounting for the igniter 40 and also a sight glass 96. Shown in FIG. 8, but actually mounted within the evaporator 28, are a thermistor 98, a low water probe 100, and a safety thermostat 112. The thermistor 98 is used to monitor the temperature of the water in the evaporator 28 and coupled with electronic temperature control circuitry, may be used to control the gas supply to the burner to maintain the temperature of the water within predetermined limits. The low water probe 100 is also linked to the temperature control circuitry and is adapted to close the control valve 72 when the probe 100, and thus possibly areas of the inner wall 48, are exposed above water level. Exposure of the probe 100 may occur in a number of circumstances: a leak resulting in loss of water from the evaporator 28; or, as is possible in this example, when the kettle 12 is tilted in the frame 24. As mentioned above, it is undesirable for exposed areas of wall 48 to be heated, such that exposure of the probe 100 results in the control valve 72 being closed to cut-off gas supply to the burner. A safety thermostat connection 112 is also provided, and will shut off the burner when the temperature of the inner wall 48 rises above a predetermined level.

Conveniently, the operator controls for the vessel are provided on a front face of a forward extension of the box 20. In this particular example, the operator controls include a temperature control knob 102 connected to a potentiometer, an on/off toggle switch 104. Also, a number of operator indicators are provided, including a evaporator/jacket pressure gauge 106, and two LED's 108, 110, a green LED 108 to indicate that the burner is on, and a red LED 110 to indicate a low water level in the evaporator.

The tilt mechanism of the vessel is substantially conventional other than the provision of the trunnion 30 being hollow to accommodate the gas supply pipe 80. Also the trunnion 30 is supported by roller bearings 118, 152 on either side of the 90° gear 122. The trunnion 30 is keyed to the 90° gear 122 by means of a rectangular key 120 and this gear 122 engages a worm 124 which is rotated by a tilt shaft 126. The worm is mounted to the shaft 126 by means of a roll pin and is located between bearing 134 and bearing 130. A hand wheel 128 is mounted to the end of the tilt shaft 126. The tilt shaft 126 is mounted, through bearing 134 on the front of box 26 and through adjustable bearing 130 located in cross member 132. Cross member 132 is in the inner compartment of the side box, which compartment also contains the bearing 116, the gear 122 and tilt shaft 126. Thus, tilting of the kettle 12 is easily achieved by rotation of the hand wheel 128.

Figure 10:
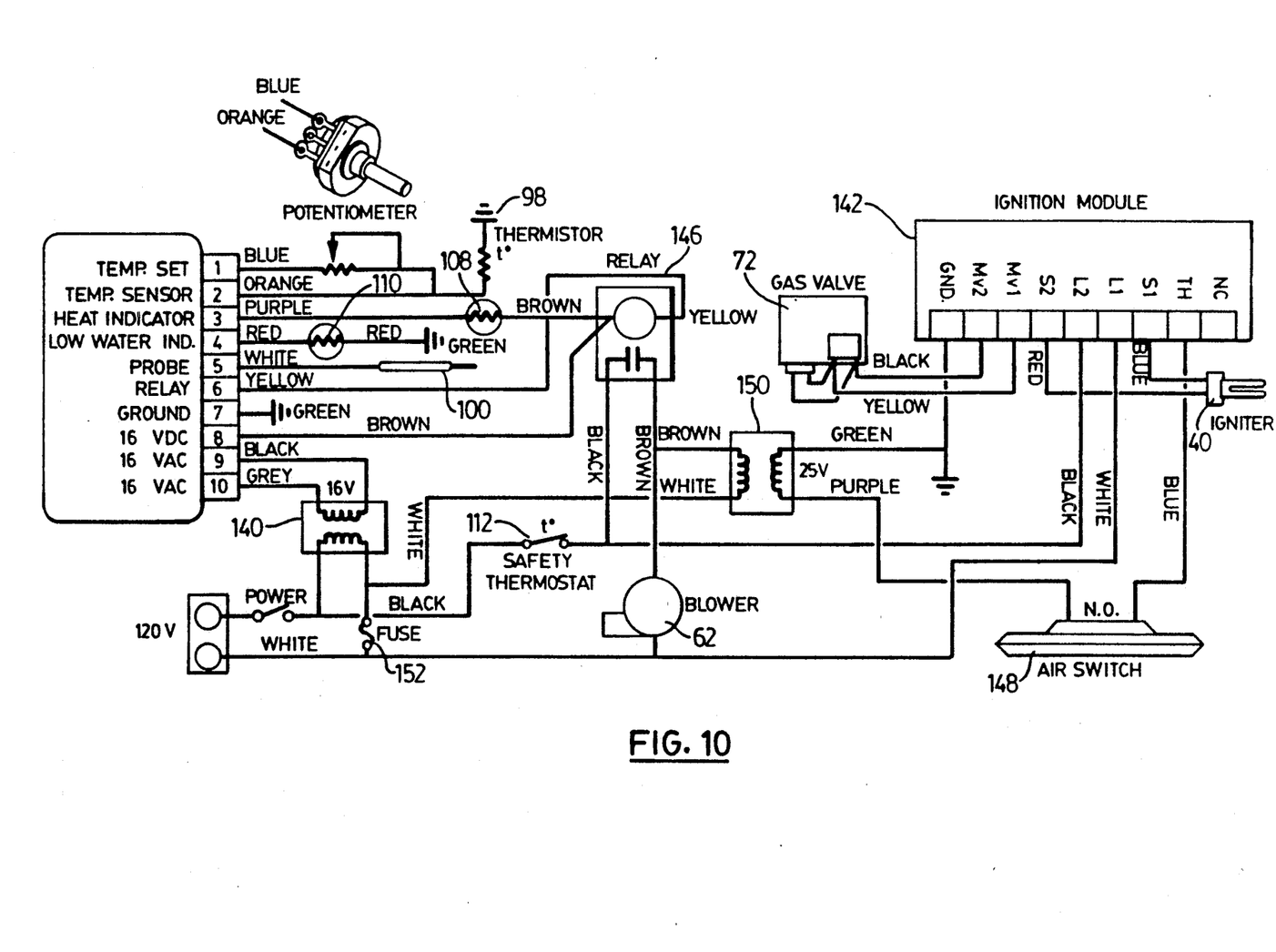
FIG. 10 is a circuit diagram of the electrical components of the cooking vessel of FIG. 1.

FIGS. 9 and 10 of the drawings illustrate electrical components and a circuit diagram of the vessel, respectively. The components illustrated in FIG. 9 are mounted in a casing 138 mounted in the lower part of the box 20 and, in this particular example include a 120–16 V transformer 140, an ignition module 142, a solid state control 144, a relay 146, a safety thermostat 112, an air switch 148, a 120–24 V transformer 150, and a ½ Amp fuse 152. The air switch 148 controls the ignition module 142 and gas valve 72 and will only operate when the blower 62 is operating. The tube 149 which links the air valve 148 to the pipe 66 may be seen in FIG. 8.

It will be noted from the above description that the vessel is relatively simple, and the burner and evaporator configuration provides for high efficiency: tests of vessels having the above-described configuration have indicated 75% efficiency with a 110,000 BTU burner, and 65.68% efficiency with a 140,000 BTU burner. In addition to improving gas consumption, the improved efficiency also reduces the time necessary for the kettle to be heated to a desired working temperature.

It will be clear to those skilled in the art that the above-described embodiment is merely exemplary of the present invention, and that various changes and modifications may be made without departing from the scope or spirit of the invention. The preferred embodiment includes a radiant, or infra-red burner, though the vessel may also be provided with a conventional burner.

We claim:

1. A cooking vessel comprising:
   (a) a kettle partially surrounded by a vapour jacket and having a pouring lip on one side thereof;
   (b) a support frame for tiltably mounting the kettle to permit the contents of the kettle to be poured from the kettle;
   (c) an evaporator for containing fluid mounted to the other side of the kettle including a tubular portion and in fluid communication with the jacket to act as a vapour source for the jacket and to receive condensed fluid from the jacket; and
   (d) a gas burner mounted to the kettle and located within the tubular portion of the evaporator.

2. The vessel of claim 1, further including a burner fuel supply line and at least one pivot mounting for mounting the kettle on the support means, wherein the supply line includes a swivel joint at the pivot mount.

3. A cooking vessel comprising:
   (a) a kettle at least partially surrounded by a vapour jacket;
   (b) an evaporator for containing fluid mounted to the kettle and in fluid communication with the jacket to act as a vapour source for the jacket and to receive condensed fluid from the jacket; and
   (c) a burner mounted to the evaporator; wherein the evaporator includes a tubular portion having inner and outer walls and the burner is located at least partially within said tubular portion; and,
   wherein the evaporator defines a flue passage which extends from the interior of said tubular portion around at least a portion of the outer surface of said tubular portion.

4. The vessel of claim 3, further including support means and wherein the kettle is tiltably mounted on said support means.

5. The vessel of claim 1, wherein the flue passage is at least partially defined by the inner and outer walls of said tubular portion.

6. The vessel of claim 1, wherein said inner and outer walls are cylindrical and the longitudinal axes of the walls are parallel, the axis of the inner wall being spaced vertically downwardly relative to the axis of the outer wall.

7. The vessel of claim 1, wherein in a cooking configuration, the vapour jacket is located around at least a lower portion of the kettle and the evaporator is located at least as low as the vapor jacket, and the fluid level in the tubular portion is maintained to completely immerse the inner wall thereof.

8. The vessel of claim 3, further including a water level sensor operable to inactivate the burner when the kettle is tilted in the support means such that the inner wall of the tubular portion becomes uncovered.

9. The vessel of claim 3, further including a tilt-switch operable to inactivate the burner when the kettle is tilted in the support means such that the inner wall of the tubular portion becomes uncovered.

10. The vessel of claim 3, wherein the burner is a radiant burner.

11. The vessel of claim 10, wherein the burner surface is cylindrical.

12. The vessel of claim 4, further including a burner fuel supply line and at least one pivot mounting for mounting the kettle on the support means, wherein the supply line includes a swivel joint at the pivot mounting.

13. The vessel of claim 4, wherein the support means includes a trunnion mount and the kettle is forwardly tiltable on said mount, the evaporator being mounted rearwardly of said mount.

* * * * *